E. MATTMAN.
DYNAMO ELECTRIC MACHINE.
APPLICATION FILED JAN. 30, 1909.
931,448.
Patented Aug. 17, 1909.
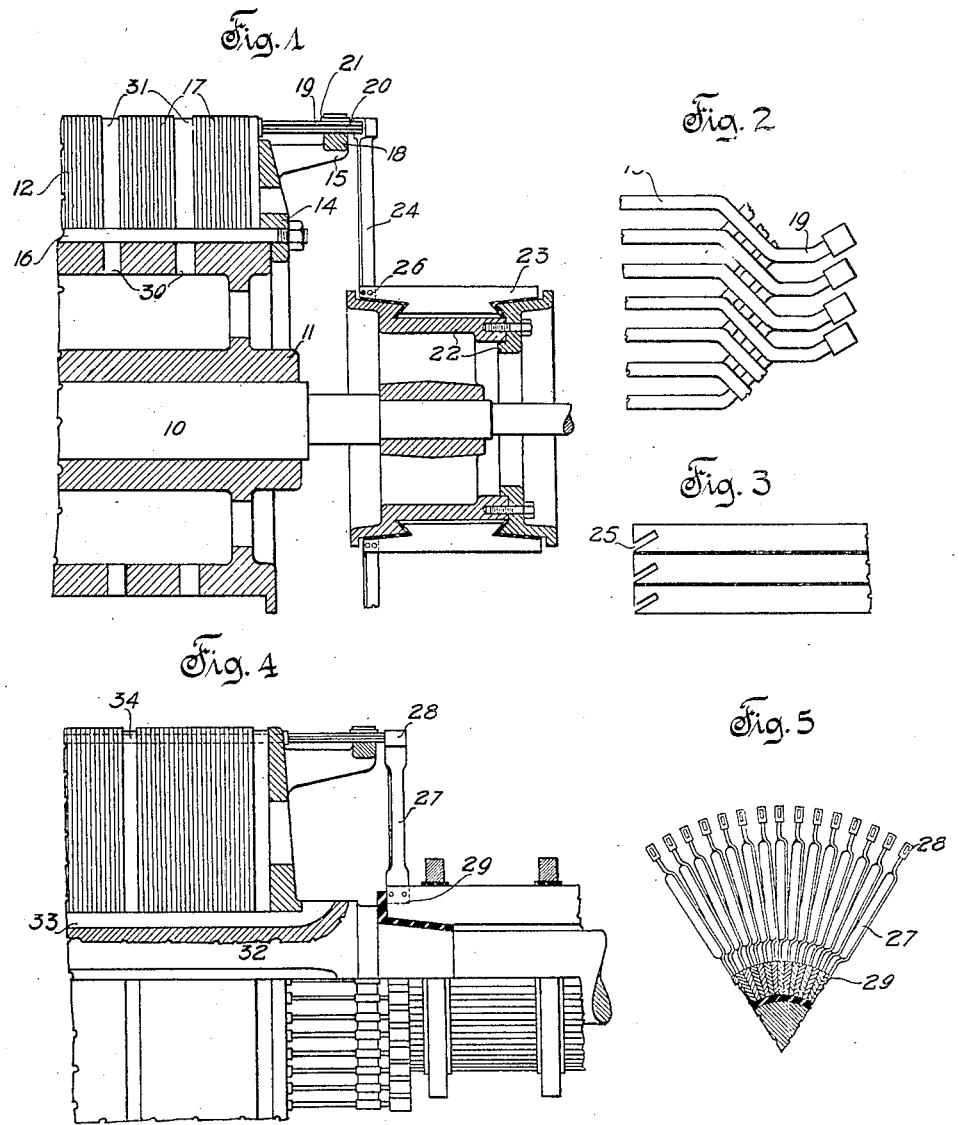

UNITED STATES PATENT OFFICE.

EMIL MATTMAN, OF MILWAUKEE, WISCONSIN, ASSIGNOR TO ALLIS-CHALMERS COMPANY, A CORPORATION OF NEW JERSEY.

DYNAMO-ELECTRIC MACHINE.

No. 931,448.    Specification of Letters Patent.    Patented Aug. 17, 1909.

Application filed January 30, 1909. Serial No. 475,251.

*To all whom it may concern:*

Be it known that I, EMIL MATTMAN, a citizen of Switzerland, residing at Milwaukee, in the county of Milwaukee and State of Wisconsin, have invented certain new and useful Improvements in Dynamo - Electric Machines, of which the following is a full, clear, and exact specification.

My invention relates to dynamo - electric machines and more specifically to means for cooling the armatures and commutators of such machines.

Revolving armatures and commutators, especially on high speed machines, tend to become excessively heated, thereby materially reducing the capacity and shortening the life of the dynamo-electric machine.

It is the object of my present invention to provide means for cooling the armatures and commutators of such machines. This is accomplished by a novel arrangement of the commutator leads which connect the commutator segments and armature winding, these leads being so arranged that they act as vanes to cause an axial flow of air.

The novel combination of parts and details of construction which comprise my invention will be hereinafter fully described and specifically pointed out in the appended claims.

In the accompanying drawings, Figure 1 is a longitudinal sectional view of a portion of the rotating member of a dynamo-electric machine embodying my present invention. Fig. 2 is a view of a group of armature conductors and commutators leads showing the skewed arrangement of the latter. Fig. 3 is a view showing the obliquity of the slots cut in the commutator segments for receiving the commutator leads of Figs. 1 and 2. Fig. 4 is a partial longitudinal sectional view of a portion of the rotating body of a dynamo-electric machine embodying a modification of the invention illustrated in Fig. 1. Fig. 5 is a view of a group of commutator leads showing the angular arrangement of the same relative to the axis of rotation.

Referring first to the arrangement shown in Figs. 1, 2, and 3, a spider 11 provided with openings 30 is mounted on a shaft 10. An armature core 12 carrying a winding 13 is mounted on the spider 11, and is clamped between end-rings 14, one or both of which are provided with integral supporting arms 15. By means of bolts 16 and the rings 14, the core laminations or disks 17, are fastened and tightly clamped. Ventilating openings 31 are formed between the core disks 17. The arms 15 support a ring 18 which is slotted to receive the end portions 19 of the armature winding. After the end portions 19 of the armature winding are set in slots 20 of the ring 18, they are tightly held by means of wedges 21. A frame 22 carrying a commutator 23 consisting of a plurality of segments, is mounted on the shaft 10 in any desired manner. Commutator leads 24, which are a combination of fan-blades and leads and made preferably flat, connect the commutator segments and armature winding. These commutator leads are also joined to the end portions of the armature winding in any desired manner, but are skewed so that the planes of said commutator leads make an angle with the axis of rotation. Because they are thus skewed, the commutator leads act as fan-blades to cause an axial as well as a centrifugal flow of air, thus greatly augmenting the fan-action and developing large currents of circulating air for cooling the armature and commutator. The slots 25 in the commutator segments, the outer ends of the end portions 19 of the armature winding, and the commutator leads are all disposed at the same angle to the axis of rotation. The leads and bars are held firmly together by means of rivets 26.

A modification of the above invention is illustrated in Figs. 4 and 5. In this case, instead of having the entire length of the collector leads 27 at an angle with the axis of rotation, only the central portions thereof are so skewed. The end portions 28 and 29, where they are joined to the end portions of the armature winding and to the commutator segments respectively, are not skewed. The shaft 32 is provided with slots 33 which communicate with ventilating openings 34 formed by spacing apart groups of the core laminations or disks.

Due to the fan-like action of the collector leads, currents of air are drawn across the commutator, forced between adjacent collector leads and rush on, circulating through the interior of the armature structure.

Many modifications may be made in the arrangements specifically shown and described, and I aim in the appended claims to cover all such modifications which do not involve a departure from the spirit and scope of my invention.

What I claim as new is:

1. In the rotary member of a dynamo-electric machine, the combination of an armature winding, commutator segments, and flat commutator leads connecting said winding and said segments, the planes of said leads making an angle with the axis of rotation.

2. In the rotary member of a dynamo-electric machine, the combination of an armature winding, commutator segments, and flat commutator leads connecting said armature winding and said segments, the planes of portions of said leads being oblique to the axis of rotation.

3. In the rotary member of a dynamo-electric machine, the combination of an armature winding, commutator segments, skewed flat commutator leads connecting said winding and said segments, and means for fastening said leads and said segments together.

4. The rotary member of a dynamo-electric machine, comprising a commutator, an armature, and means for causing the cooling of said commutator and said armature, said means comprising skewed commutator leads.

5. In the rotary member of a dynamo-electric machine, the combination of an armature winding, commutator segments and commutator leads connecting said winding and said segments and so skewed that they act as fan-blades to cause an axial flow of air.

Milwaukee, Wis., Jan. 19, 1909.

In testimony whereof I affix my signature, in the presence of two witnesses.

EMIL MATTMAN.

Witnesses:
H. C. CASE,
CHAS. L. BYRON.